7760Y
2 Sheets—Sheet 1
W. B. Leonard.
Drawing Frame for Spinning Mach.
Patented Sep. 16, 1833.
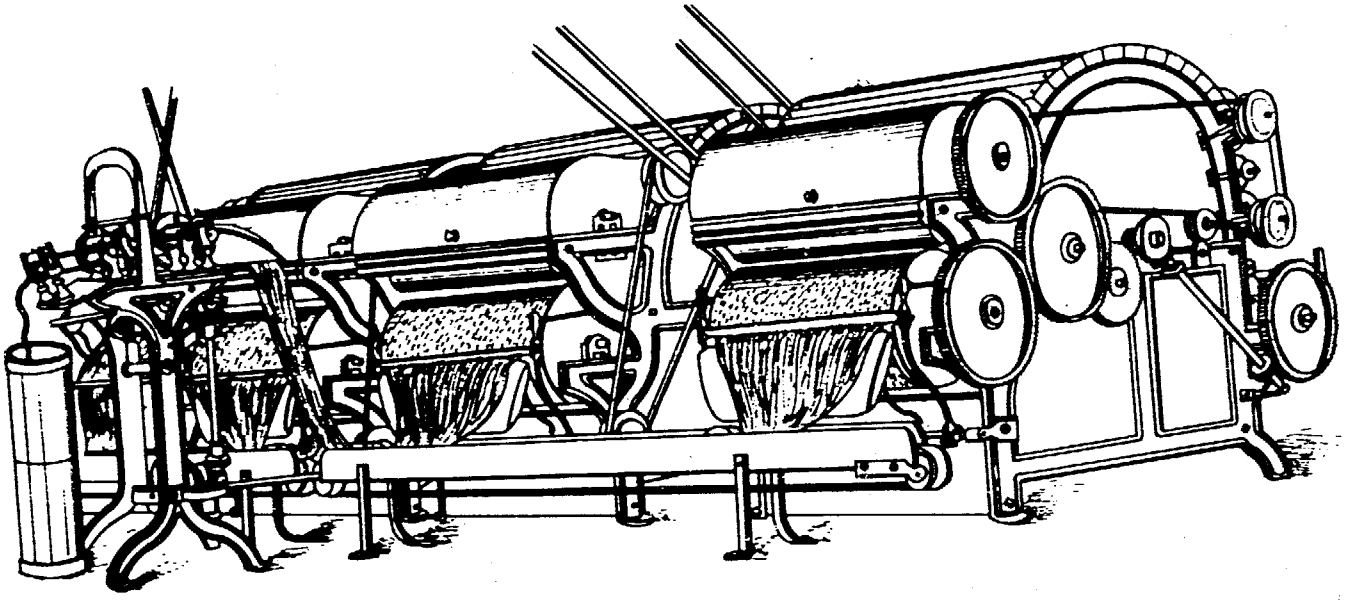
N. PETERS, PHOTO-LITHOGRAPHER, WASHINGTON, D. C.

7760X
2 Sheets
Sheet 2
W. B. Leonard,
Draming Frame for Spinning Mach
Patented Sep. 16, 1833.
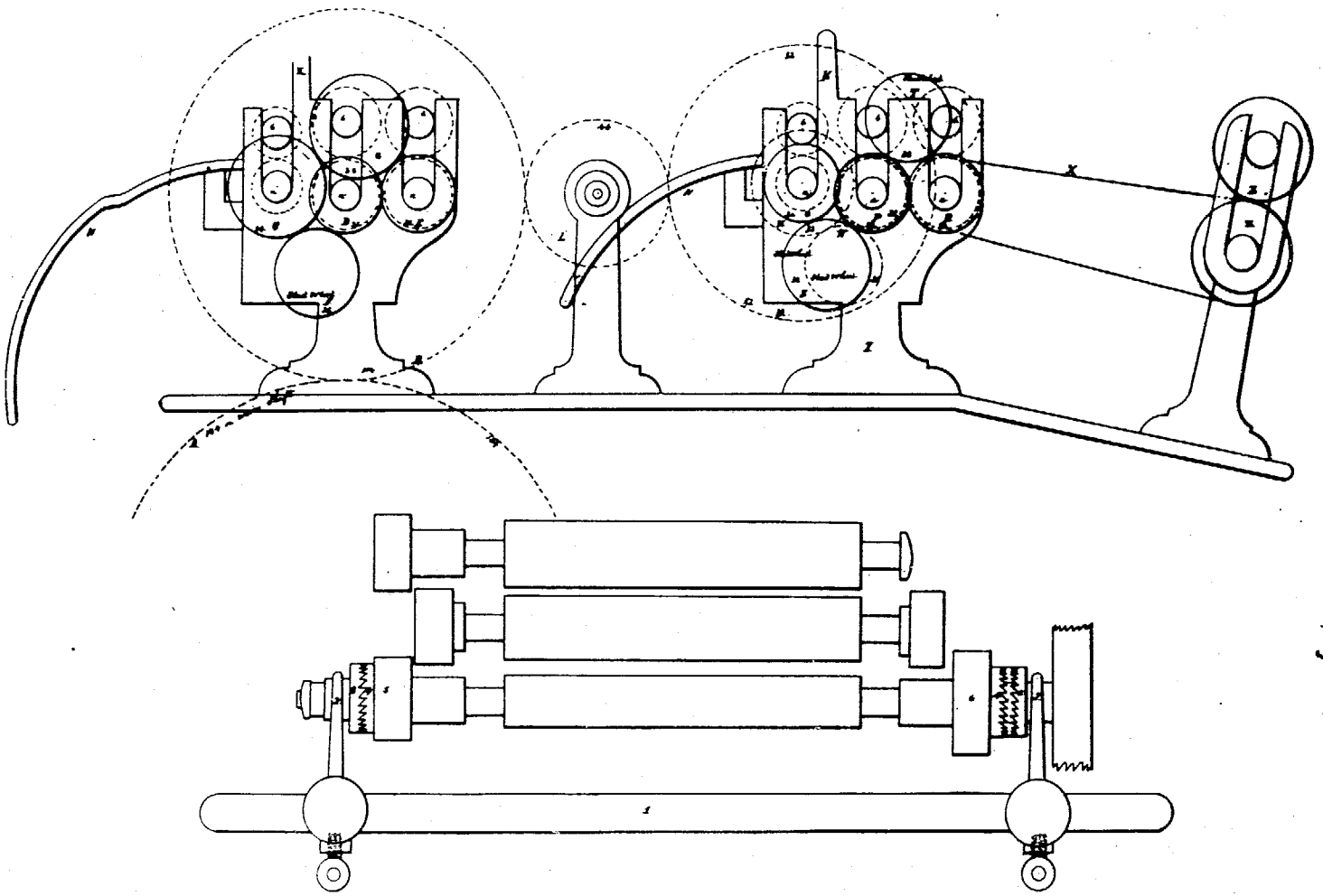
H. PETERS, PHOTO-LITHOGRAPHER, WASHINGTON, D. C.

Sept 16 1833 139

X 7760

William B. Leonard.

The schedule referred to in these Letters Patent & making part of the same, containing a description in the words of the said William B. Leonard himself of his Improvement in the machinery for carding cotton called Leonards improved cotton carding engine.

---

To all persons to whom these presents may come: I William B. Leonard of Fishkill, in Dutchess County, in the State of New York send Greeting: Be it known that I the said Leonard have invented, constructed & applied to use a new & useful improvement in machinery for carding cotton called Leonards improved cotton carding engines specified in the words following (to wit). Note - In the following description the end of the machine upon which the intaking rollers are placed or where the cotton enters the machine is termed the back end & the end upon which the doffer is placed, or where the cotton is delivered is called the front end .. and the side where the driving pulleys upon the shaft of the main cylinder are placed is called the pulley side, & the opposite is called the gear side. This machine consists of a framing of iron, three feet & six inches long, with two principal upright posts on each side. These posts are two & a half inches wide & three eights of an inch thick, having mouldings or flanges on each edge projecting five sixteenths of an inch from the face of the posts. A girth of the same width & thickness & flanged in like manner connect these posts at a distance upwards from their feet of five & a half inches. Below these girths the back posts are turned backwards six inches to cause it stand more firmly upon the floor: on the back posts at the height of one foot & eight & three quarter inches are projected backwards at right angles with the posts a piece of equal thickness & width with the post extending fourteen inches, & is supported by a curved brace connecting with the post twelve & a half inches from its foot & the curvature extending to the foot of the post & forming the backward turn of the same, leaving between the post the projected piece (and the brace a triangular opening [illegible] the projected piece) is slitted to receive the bearing & bolt to sustain & adjust the shaft of the breast cylinder, & this piece is slightly projected each side of the slit to
give it strength - on the back edge of the post six inches above the last
mentioned piece is a semicircular projection extending backwards one
& a quarter inch, with a hole in it to receive a crossbar to hold the
side frames together - Above this piece the post receives the plate
which connects the back & front posts - This plate is of the same thickness
& flanged like the posts, & is three inches deep or wide, & is connected with
the girth below by an upright piece of the same thickness with the posts
& is three inches wide & flanged, & is fourteen & three quarter inches from the
back post - Directly over this upright piece on the top of the plate, a
piece is raised one & three quarter inch high & one & a half inch thick
& four & a half inches long, & rounded at the ends, containing in the middle
a bearing for the shaft of the main cylinder two & three quarter inches long.
The front posts are of equal thickness & flanged like the back posts & rise
perpendicularly from the feet receiving the girth from the back posts & pass
upwards from the foot seventeen inches, where a curve commences for a
projection forwards which rises in an angular direction until it projects
from the front edge of the post five & a half inches, & is twenty & a quarter
inches high from the foot of the post, when it rises perpendicularly three
and a half inches - At the height of eighteen & a half inches from the foot
of the post a curve from the back edge commences backwards, until its
inclination backwards is two & seven eighths inches when the post assumes
its perpendicular direction again - At the height of twenty-three & a
quarter inches it receives the top piece connecting these forward &
backward projections which is eight & three quarter inches long on the
top face & two inches wide or deep leaving a triangular open space
between the projecting & top pieces of five & three quarter inches upon
its base under the top piece, & a perpendicular of two & a half inches to
its apex below which is in a direct line with the front edge of the post
below - This top piece is slotted the whole length of the opening to
receive the bearing for the doffer, (& for adjusting) the same & is slightly
projected against the slit to preserve its strength - The front post is
continued upwards to the heighth of two feet & three & a half inches from

X7760 the foot where it receives the plate with a small curvature to strengthen the
corners. From the ends of this plate an arch is raised being something more
than a semicircle whose radius is eighteen & a half inches, & whose center is
on the middle of the piece forming the bearing of the main Cylinder -
This arch is of the same thickness of the posts and flanged on the outside
of each edge. Where the arch joins the back end of the plate a projection is
formed outwards from the center two inches, & upwards two & a half inches
& at the height of eight & a half inches, a similar projection is raised
from the arch, these projections are formed by the upper flange of the
arch only, leaving open the space between them & the lower or inside
flange, & also of that section of the arch itself which is between them -
These projections are slitted on the top & form the supports for the two
back workers whose stripper is adjusted in the space between them.
From the front edge of the front post at its junction with the
plate, a projection forwards, is formed by a double curve: the first
of which commences at the top of the piece which sustains the doffer
& is formed with a radius of six & a half inches its center being outwards
in a line with the top of the piece which sustains the doffer & its periph-
ery commencing at the front edge of the post. The other curve is
formed with the same radii with the center back or inwards. these
two curves are made to form a projection whose extreme will be
directly over and perpendicular to that which supports the doffer &
fifteen & a quarter inches above it. It is two & a quarter inches wide
& of the same thickness & flanged like the posts. A top piece is extended
from this projection to the arch constituting a seat for the bearing
for the shaft of the front worker. This top piece is two & a quarter
inches wide & one foot long, an opening is formed between the
circular projection the top piece & the arch of an irregular form
approaching a triangular but interrupted by the form of the sides
& curvatures of the corners. The top piece is slitted over the opening
to receive the stand & bolt for the front worker & is slightly projec-
ted against the slit to preserve its strength. All the [illegible] pieces where
openings are formed between the posts, the girth & the plate, the upright

X7760 piece joining the girth & plate under the main cylinder shaft, the plate & the arch & the pieces supporting the front worker, are cast with inside flanges for a pannelling of wood to rest against to close up the openings - The several parts of these sides are described as pieces, but they are to be understood as forming one entire piece of casting with only this exception that the arch is formed of two pieces, that one may be removed, to admit the main cylinder with its shaft - The front part of the arch is cast with the framing until it rises one foot from the plate, where it is cut in a line with the center - The remaining part of the arch is flanged only on the outer face, & an ear from the inside, passes down the standing part of the arch filling the space between the flanges, & is bolted firmly to it - The other end of the arch rests on the top of the back end of the plate, & a plate of iron is fitted & screwed to it on the inside extending upwards beyond the upper projection for the workers forming a back to them & the arch & passing downwards on the inside of the plate, to which it is firmly bolted, bringing the flanges on the outside of the arch even with those of the plate so that the whole arch appears to the beholder as one entire piece of casting with the frame - These sides are supported by beams of wood of suitable thickness to fill the space between the flanges of the frame, where they are placed & are all two feet & four inches long & secured by joint bolts - The first piece is between the back legs on a level with the girth at the lower edge & is six & a half inches wide - The second is placed at the back extreme of the projection for the intaking rollers, & is three & a half inches wide - The third is between the front posts the bottom edge level with the feet & is fifteen inches wide & double bolted - In addition to these beams the sides are supported by an iron rod passing thro' the holes in the semicircular projection above the breast cylinder screwed firmly by a nut on the outside to a shoulder on the inside, & also by a piece of casting passing from arch to arch just forward of the projection for the upper worker and held by a bolt passing thro' the arches into the piece in which the female screw is cut, also by a piece of casting two & a half inches wide extending across the frame, & bolted to the front of the projections supporting

X7760 the front worker, the front face of this piece may be ornamented
according to fancy - When these several parts are adjusted a frame is
formed. Two feet & four inches wide on the inside. To this frame the fol-
lowing pieces or parts are attached for the purposes named, a stand
is bolted to the back post on the gear side on the back end of which
is the step for the worm shaft this stand is placed eleven inches high
from the foot of the post & is seven inches long. On each projection for
the intaking & breast rollers a stand Ten inches long is bolted on the
lower extreme back of which is the bearings of the unwinding roller
which turns the bat roller to deliver its cotton to the cards & over this
at the back end a grooved upright is projected to guide & hold in
place the bat roller, as it diminishes in diameter by the unwinding
of the batting, they are on the inside & wide nine & a half inches. On the
front end of this stand is the bearings for the intaking rollers pro-
jected upwards & grooved for a guide to keep the Top roller in place;
On the outside of this stand on the pulley side of the frame a stand
is bolted with its Stud for a Stud-wheel to give motion to the
unwinding roller. A piece of iron polished on its upper surface is
bolted to the Top of these stands extending across the frame & filling the
whole space between the unwinding & the intaking rollers for the cotton
to slide on as it leaves the bat roller - Bearings with caps, screws
& bolts are placed on the same projection over the slits for the breast
cylinder shaft to Turn in - The poppet heads are passed thro' the
slits in the projections on the arch & the feet of their screws, passes the
inside arch & a nut on each side adjusts their height & a screw
thro' each side of the projections adjusts them to the Stripper, these pop-
-pets are seven & a half inches long & form a bearing in their heads
for the shaft of the workers - A like poppet six inches long is passed
the arch intermediate between these with nuts to raise & depress it
to & from the main cylinder, with bearings in the heads for the back
Stripper - Thirteen steady pins are then inserted into the Top of the
arch rising two & a half inches in a line with the center at a dis-
tance of two & a half inches from each other to keep the flats in place

X7760

& on each side of these pins are regulating screws for the flats to rest
upon & to adjust them to the main cylinder - a stand is bolted to
each arch forward of the flats to hold the poppets for the front
stripper which sustains its shaft & is regulated by screws - a bearing
with caps & screws is placed on the projection for the front worker, & is
bolted to it thro' the slit & forms the bearing for the front worker
shaft - The bearings with caps & screws are placed upon the pro-
jected piece for the doffer & are bolted thro' the slit & form the bear-
ings for the doffer shaft - on the outside of each front post a bolted
a stand for the crank shaft to turn in - On the plate on the gear
side of the frame is bolted a stand with its stud for the stud wheel
which communicates motion to the front worker & the doffer - A stand
is also bolted to this plate with its stud to hold a stud wheel having
a pinion on its hub to give motion to the last mentioned stud wheel.
Another stand is also bolted to this plate projecting outwards to form
a bearing for the upper end of the worm shaft - A stand is also
bolted to this plate with its stud to support a friction pulley, & lastly
a steel spring is bolted to the inside of each plate to hold the
top of the comb pitmen - All these parts & pieces being properly
secured to the framing the following cylinders, rollers, & pieces with
their furniture are placed upon them - First the main cylinder
shaft having on it the cylinder three feet in diameter & two feet
& one inch long, and on its pulley end a loose pulley twelve inches
in diameter & two & a half inches on the face, next a fast pulley of
like dimensions; then between this & the frame a flanged pulley,
sixteen inches in diameter between the flanges & one & a half inch on
the face - On the gear end of this shaft there is next the frame
a pinion wheel of thirty teeth & on the end is a bevel wheel of
sixty teeth having its face or toothed side inwards - The unwinding
roller is of wood three inches in diameter having on its shaft on
the pulley end a wheel of thirty-five teeth - The intaking roller is
one & a half inches in diameter is fluted & has on the gear end of
its shaft a wheel of one hundred teeth fitted to match with the

X7760 turned by the worm, & on the pulley end of this shaft is a wheel of eleven
teeth - The Top intaking roller, is similar to the last described, &
has on the pulley end a wheel of eleven Teeth - The breast cy-
linder is eight inches in diameter having on the pulley end of its
shaft a pulley seven & a half inches in diameter flanged & one
& a half inch on the face - The two back workers are six inches in
diameter having on the gear end of their shafts a pulley four & three
quarter inches in diameter flanged & one inch & a half on the face.
The stripper between them is three inches in diameter & has on
the pulley end of its shaft a flanged pulley six & three quarter inches
in diameter & one & a half inch on the face. Thirteen flats Two & a
half inches wide, are fitted to go on the steady pins & rest on the
adjoining screws. The front stripper cylinder is three inches in
diameter having on its shaft at the pulley end, a pulley six & three
quarter inches in diameter flanged, & one & a half inch on the
face. The front worker cylinder is one foot in diameter having
on the gear end of its shaft & next to the frame a flanged pulley
seven & a half inches in diameter & one & a half inch on the face.
And on the outside of this pulley, & on the end of the shaft it has
a wheel of ninety Teeth, the doffer cylinder is fifteen inches in di-
ameter, having on the gear end of its shaft a wheel of one hundred &
fourteen Teeth. The comb or crank shaft is one inch in diameter,
with two cranks of one inch sweep having on its pulley end, a pulley
of, six inches diameter flanged, & one & a half inch on the face -
Connected with the cranks, are two curved pitmen extending from
the cranks to the springs projected from the plates, which they receive
in a slit near the top of the pitmen in other slits in the pitmen
directly in front of the center of the doffer. the clearing comb is secured
passing, from pitman to pitman nearly in contact with the cards
on the doffer, to clear them of the carded cotton - The worm shaft
has on the top a bevil wheel of thirty-two teeth to match the one
on the main cylinder shaft, & near the step a worm, to give motion
to the worm wheel, this shaft is one inch in diameter & two feet

X7760

& four inches long. All these several rollers & cylinders are of the same length with the main cylinder & are turned on the journals of their shafts to fit their bearings as described, having their pulleys & cog wheels in a direct line with those with which they communicate are entered into the places prepared for them on the frame as described. All these cog wheels, except those termed bevel wheels are what is called spur-wheels, or have their teeth outwards from the center & all the wheels, have eight teeth to each inch of their diameter; & the cylinders & flats are to be clothed with suitable cards on two feet of the length of their surface. When all are thus arranged an endless belt is passed over the flanged pulley on the main cylinder, under the pulley on the breast cylinder, over the pulley on the back stripper shaft, over the pulley on the front stripper shaft, under the pulley on the comb shaft & again to the pulley on the main cylinder. A similar belt is passed over the pulley on the front worker shaft, over the pulley on the upper back worker shaft, under the pulley on the shaft of the lower back worker, over the friction pulley & again to the pulley on the shaft of the front worker. The large stud wheel on the gear side of the frame is adjusted to gear into the wheels on the front worker & doffer shafts, adjust the other stud wheel, so that the pinion on its hub will gear into the wheel which turns the front worker & doffer & the wheel in gear with the pinion on the shaft of the main cylinder. Place the worm shaft in its step & bearing so that the wheel on the upper end will be in gear, with its match on the other end of the main cylinder shaft, & the worm near the step in gear with the worm wheel on the gear end of the intaking roller. Place the stud wheel on the pulley side of the frame so that it will be in gear with the wheel on the pulley end of the intaking roller & the wheel on the shaft of the unwinding roller lay the top intaking roller in its grooves so the wheel on the end will be in gear with the wheel on the pulley end of the lower intaking roller, place the lap roller loaded with cotton from the spreading machine with

X7760 the ends of its shaft in the grooves of the upright part of the stands holding the unwinding roller, the cotton will rest upon the unwinding roller - Unwind enough to reach & place the front edge of the lap between the intaking rollers - When a belt from the moving power of the mill runs upon the fast pulley on the shaft of the main cylinder will put all in motion - The cotton will pass the intaking rollers to the breast cylinder & be carried by that to the main cylinder between which & the workers strippers, & flats it will be carded until it is received upon the doffer, from which it will be cleaned by the comb in or bat ready to be received into the rail way of a machine improved by me & described in a specification bearing even date with this instrument - The foregoing is a description of the cards I have in use, but this improvement is not confined to this size & proportioned cards but it is applicable to all cards of any diameter & length of cylinder. Now all the aforesaid parts of the foregoing described machine, such as breast main cylinder, workers, strippers, flats doffer, comb &c. are well known & in common use - And to their invention I make no claim whatever - But what I do claim as new is the arrangement & location of these several parts (in the manner before described) so that a much greater proportion of the surface of the main cylinder is brought into action with the other parts - And a greater number of those parts brought into contact & used with it - Note - I am aware that this object has been heretofore in a measure obtained by raising the main cylinder above the plates of the frame, which was necessary to have the feed apron & table high enough to feed the card conveniently, & the doffer high enough to deliver the cotton to a can - But since I have introduced the spreading machine I can with greater convenience feed the card lower down, - & since I have used the railway alluded to above I am enabled to depress the doffer also & place it much below the center of the main cylinder with great advantage both to the carding engine & the rail way, & the depressing or placing this cylinder below the centre of the main cylinder, & bringing so great

148. X7760 a proportion of that cylinder into action with the other carding parts without raising the cylinder itself constitutes my improvement of this engine, again I derive much advantage from the improvement of placing a worker & stripper cylinder between the flats & the doffer on the main cylinder from which great benefit is derived in the carding process & especially in leaving the cotton upon the main cylinder in the best possible position to be received upon the doffing cylinder - The general arrangement of, & combination of the several parts of this machine & the location of them on the improved plan as before described & claimed by me are new & useful & constitute the novelty for which a Patent is now prayed & are more fully illustrated by reference to the plate appended to this specification upon which four cards are represented at work with my improved railway drawing head A. shows the position of the journal or center of the main cylinder shaft. B. the feed rollers depressed nine & a quarter inches below - The main cylinder C. shows the position of the doffer cylinder depressed six & a quarter inches below the main cylinder, D. shews the position of the front worker, & E. that of the front stripper both between the flats & the doffer all which are fully illustrated by a model in the Patent office to which reference is made.

In Testimony that the above is a true specification of my said improvement as above described, I have hereunto set my hand. this 29th day of August 1833.

W. B. Leonard

Witnesses
Henry Schenck
Elisha S. Abel

Drawing in port folio

[[illegible]]

[4306 words]